(12) United States Patent
Weagle

(10) Patent No.: US 7,717,212 B2
(45) Date of Patent: May 18, 2010

(54) VEHICLE SUSPENSION SYSTEMS FOR SEPERATED ACCELERATION RESPONSES

(75) Inventor: David Weagle, Edgartown, MA (US)

(73) Assignee: Split Pivot, Inc., Edgartown, MA (US)

( * ) Notice: Subject to any disclaimer, the term of this patent is extended or adjusted under 35 U.S.C. 154(b) by 437 days.

(21) Appl. No.: 11/510,522

(22) Filed: Aug. 25, 2006

(65) Prior Publication Data

US 2008/0067772 A1    Mar. 20, 2008

(51) Int. Cl.
 *B62D 61/02* (2006.01)
(52) U.S. Cl. .................. 180/227; 280/283; 280/284; 280/285; 280/286; 280/288
(58) Field of Classification Search ................ 180/227; 280/284, 283, 285, 286, 288
See application file for complete search history.

(56) References Cited

U.S. PATENT DOCUMENTS

| 439,095 | A | 10/1890 | Becker |
|---|---|---|---|
| 4,789,174 | A | 12/1988 | Lawwill |
| 5,121,937 | A | 6/1992 | Lawwill |
| 5,217,241 | A | 6/1993 | Girvin |
| 5,244,224 | A | 9/1993 | Busby |
| 5,306,036 | A | 4/1994 | Busby |
| 5,409,249 | A | 4/1995 | Busby |
| 5,441,292 | A | 8/1995 | Busby |
| 5,474,318 | A | 12/1995 | Castellano |
| 5,509,679 | A | 4/1996 | Leitner |
| 5,553,881 | A | 9/1996 | Klassen et al. |
| 5,628,524 | A | 5/1997 | Klassen et al. |
| 5,671,936 | A | 9/1997 | Turner |
| 5,678,837 | A | 10/1997 | Leitner |
| 5,791,674 | A | 8/1998 | D'Aluisio et al. |
| 5,899,480 | A | 5/1999 | Leitner |
| 6,102,421 | A | 8/2000 | Lawwill et al. |
| 6,199,886 | B1 | 3/2001 | Guenther |
| 6,203,042 | B1 | 3/2001 | Wilcox |
| 6,206,397 | B1 | 3/2001 | Klassen et al. |
| 6,237,706 | B1 | 5/2001 | Karpik et al. |
| 6,263,994 | B1 | 7/2001 | Eitel |
| 6,378,885 | B1 | 4/2002 | Ellsworth et al. |
| 6,450,521 | B1 | 9/2002 | Turner |
| 6,471,230 | B2 | 10/2002 | Ellsworth et al. |
| 6,592,108 | B1 | 7/2003 | Luede |

(Continued)

FOREIGN PATENT DOCUMENTS

FR      2 774 966      8/1999

(Continued)

OTHER PUBLICATIONS

Crestone Peak Bikes, Crestone Peak Bikes '94, printout from website http://mombat.org/Crestone.htm, date of publication unknown, 5 pages, not numbered, publisher name, city and country unknown.

*Primary Examiner*—Lesley Morris
*Assistant Examiner*—Maurice Williams
(74) *Attorney, Agent, or Firm*—Stahl Law Firm

(57) ABSTRACT

The invention relates to suspension systems comprising, in certain embodiments, a pivoting means concentric to a wheel rotation axis so that braking forces can be controlled by placement of an instant force center, and so that acceleration forces can be controlled by a swinging wheel link.

64 Claims, 7 Drawing Sheets

U.S. PATENT DOCUMENTS

| | | |
|---|---|---|
| 6,595,538 B2 | 7/2003 | Ellsworth et al. |
| 6,698,780 B2 | 3/2004 | Miyoshi |
| 6,843,494 B2 | 1/2005 | Lam |
| 6,854,753 B2 | 2/2005 | Turner |
| 6,969,081 B2 | 11/2005 | Whyte |
| 2001/0024024 A1 | 9/2001 | Klassen et al. |
| 2003/0038450 A1 | 2/2003 | Lam |
| 2003/0090082 A1 | 5/2003 | Ellsworth et al. |
| 2005/0057018 A1 | 3/2005 | Saiki |
| 2005/0285367 A1* | 12/2005 | Chang et al. ................ 280/284 |
| 2006/0181053 A1* | 8/2006 | Huang et al. ................ 280/284 |
| 2006/0197306 A1* | 9/2006 | O'Connor ................... 280/284 |
| 2008/0073868 A1* | 3/2008 | Weagle ..................... 280/124.1 |

FOREIGN PATENT DOCUMENTS

| | | |
|---|---|---|
| GB | 1 498 168 | 1/1978 |
| WO | WO03/018392 | 3/2003 |
| WO | WO03/037701 | 5/2003 |

\* cited by examiner

VEHICLE SUSPENSION SYSTEMS FOR SEPERATED ACCELERATION RESPONSES

1.0 FIELD OF THE INVENTION

This invention relates to suspension systems capable of separating acceleration responses.

2.0 BACKGROUND

Automobiles, bicycles, motorcycles, all terrain vehicles, and other wheel driven vehicles are used for various purposes, including transportation and leisure. These vehicles are designed to use a power source to drive through a power transmission system to a wheel or wheels, which transfers rotary motion to the ground via tractive force between a wheel or wheels and the ground. Vehicles are also used to traverse even terrain like paved streets, and uneven terrain like off-road dirt trails. Off road trails are generally bumpier and allow for less wheel traction than paved roads. A bumpier terrain is best navigated with a vehicle that has a suspension system. A suspension system in a vehicle is aimed to provide a smoother ride for an operator or rider, and increase wheel traction over varied terrain. Vehicle suspension systems for the front wheel and for the back wheel are available. These vehicles have means of powered acceleration and deceleration. Powered acceleration can be achieved through machine or human power rotating a wheel through a mechanical arrangement. Deceleration can be achieved through the use of a braking system that mechanically impedes rotation of a wheel.

One undesirable effect of suspension systems is unwanted responses or suspension compression or extension during powered acceleration or deceleration. Acceleration and deceleration forces cause a suspension system to react in different ways. It is beneficial to rider comfort for a suspension to be designed to specifically recognize and respond to differing acceleration and deceleration forces. Complex systems using linkages or hydraulic means exist to reduce unwanted suspension movement that occurs during acceleration or deceleration. The drawback to these other systems is their complexity and associated cost. With more complex designs, more expensive manufacturing techniques are required to build them. Less complex systems are more cost effective, but do not allow for the separation of acceleration forces under powered acceleration and braking, which reduces suspension effectiveness, but allows a lower overall cost.

A need exists for suspension systems that can provide separated acceleration and deceleration responses while remaining cost effective to produce. The present invention provides new suspension systems for vehicles that can provide separated acceleration responses and that are cost effective.

3.0 SUMMARY OF THE INVENTION

The current invention relates to new suspension systems for vehicles, for example, bicycles, motorcycles, cars, SUVs, trucks, two wheel vehicles, four wheel vehicles, front wheel suspension vehicles, driven wheel suspension vehicles, and any other kind of vehicle with a suspension system. In certain embodiments of the invention, a suspension system of the invention can support a wheel using a link arrangement to control suspension movement by manipulating braking forces present in the links during deceleration.

Suspension systems of the invention are useful for a variety of vehicles and preferably in human powered vehicles. Unwanted suspension movement can have a significant detrimental effect on rider performance and comfort. The need for a suspension system that can control suspension movement under acceleration and deceleration has therefore become more pressing. The present invention provides suspension system designs for vehicles that reduce unwanted suspension movements during acceleration and deceleration.

Certain embodiments of the invention can comprise a wheel suspension system where a wheel is connected to a wheel link. In certain embodiments, a braking arrangement intended to impede wheel rotation when needed is attached to a brake link. The brake link, in certain embodiments, may be attached to the wheel link through a pivoting or flexing connection concentric to the wheel rotation axis, and attached at another point through a pivoting or flexing connection to a control link. The brake link, in certain embodiments, can be attached to the wheel link through a pivoting and/or flexing connection, and in certain other embodiments the brake link is attached at another point through a pivoting and/or flexing connection to a control link. The control link and wheel link, in certain embodiments, each have a link force line. A link force line of a control link and a wheel link, in certain embodiments, intersect in a point called instant force center. The location of this instant force center, in certain embodiments, governs suspension reaction to deceleration as a result of braking.

Certain embodiments of the invention can comprise a shock absorber. A shock absorber, in certain embodiments, may be a damper, a spring, a compression gas spring, a leaf spring, a coil spring, or a fluid. In certain other embodiments, a shock absorber is mounted so that it is able to respond to movement of a rear wheel. In certain embodiments, a shock absorber is mounted to a brake link. In certain embodiments, a shock absorber is mounted to a control link. In certain embodiments, a shock absorber is mounted to a brake link and/or a control link in a pivotal manner, and preferably so that a force that compresses or extends the shock absorber is transmitted through a brake link or a control link.

4.0 BRIEF DESCRIPTION OF THE DRAWINGS

5.0 DETAILED DESCRIPTION

Figure 1:
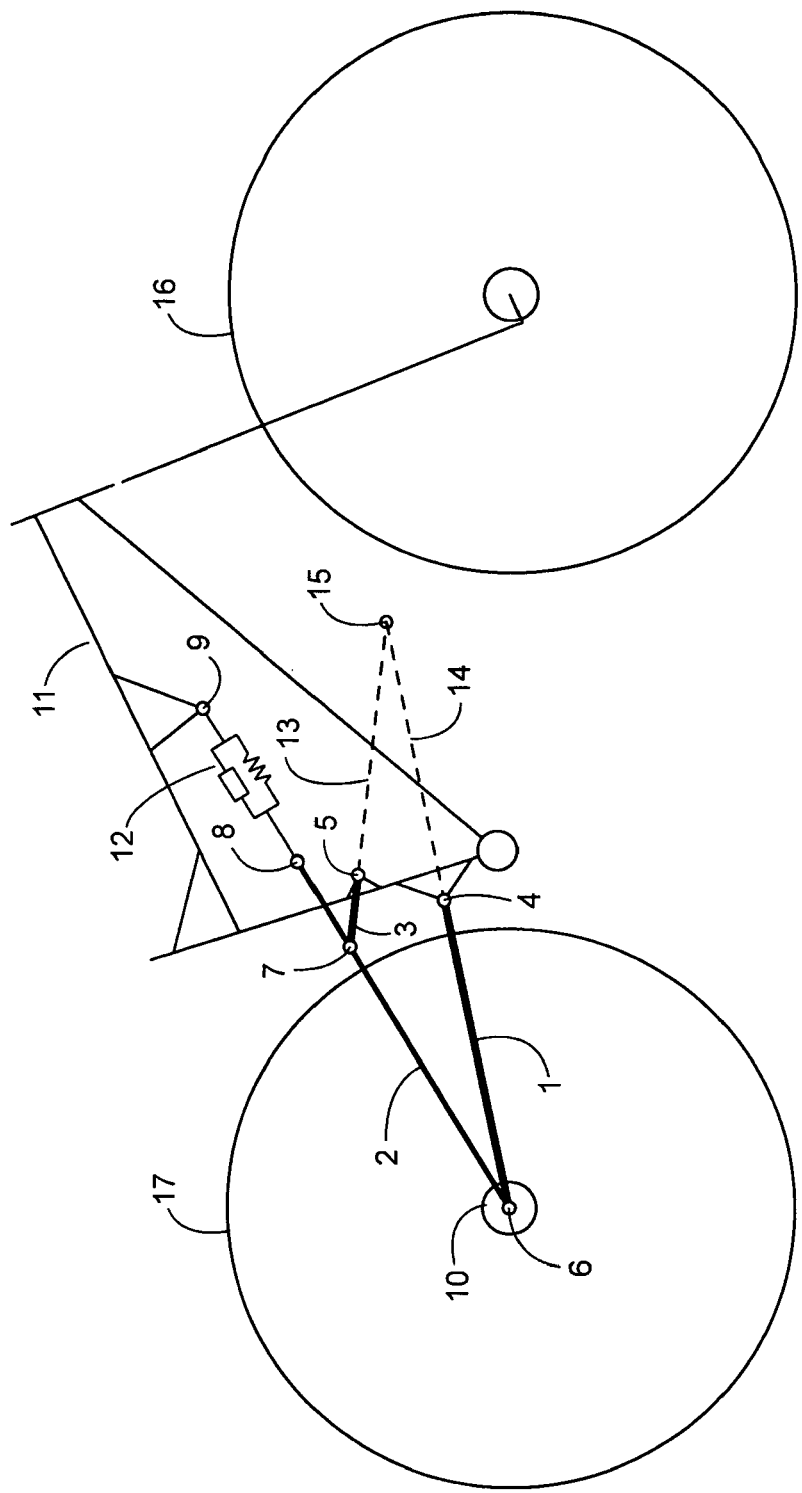
FIG. 1 shows a diagrammatical side view of a vehicle using a wheel suspension system that according to certain embodiments of the current invention. The vehicle is shown with the wheel suspension system in an uncompressed state.

Vehicles must be accelerated against their environment to propel an operator or rider across terrain. In order to accelerate these vehicles, a certain amount of energy must be exerted and transformed into rotary motion at a wheel or plurality of wheels. Suspended wheeled vehicle energy conversion types are widely varied. Some vehicles like bicycles, tricycles, and pedal cars use converted human energy as the drive unit. Other vehicles use electric motors or combustion engines, as their drive unit. These electric motors and combustion engines extract rotary motion through the controlled release of chemically stored energy.

Almost all vehicle types use some sort of rotary motion transmission system to transfer rotational force from a drive unit to a wheel or plurality of wheels. A simple bicycle or motorcycle or all terrain vehicle uses a chain or belt to transfer power from a drive unit to a wheel. These chain or belt drive transmissions typically use one sprocket in the front which is coupled to a drive system and one sprocket in the rear which is coupled to a wheel.

More complex bicycles, motorcycles, all terrain vehicles, and automobiles use a shaft drive system to transfer power from a drive system to a driven wheel or wheels. These shaft drive systems transfer power through a rotating shaft that is usually reasonably perpendicular to the driven wheel spinning axis, with power transferred to the driven wheel via a bevel, spiral bevel, hypoid, worm gear drivetrain, or some other means. These single sprocket chain and belt, and shaft driven vehicles can use a direct driven single speed arrangement, where drive unit output shaft speed and torque is transferred to the driven wheel at a constant unchanging ratio. These single sprocket chain and belt, and shaft driven vehicles can also use a commonly found multi speed arrangement, where drive unit output shaft speed and torque is transferred to the driven wheel at a variable ratio through operator selected or automatically selected ratio changing mechanisms.

A bicycle with a more advanced design includes gear changing systems that have clusters of selectable front chainrings and rear sprockets. These gear changing systems give the bicycle rider a selectable mechanical advantage for use during powered acceleration. The mechanical advantage selection, allows a rider spinning a front sprocket cluster via crank arms, to attain lower revolution speed and higher torque values, or conversely, higher revolution speed and lower torque values at a driven wheel.

The current invention, in certain embodiments, is directed at suspension systems for vehicles that can reduce unwanted suspension movement during braking deceleration, for example, a bicycle, a motorcycle, a car, an SUV, a truck, or any other kind of vehicle. Suspension systems of the current invention are useful for a large variety of vehicles, including, but not limited to, human powered vehicles, off road use vehicles with long displacement suspension, high efficiency road going vehicles, and other vehicles.

A vehicle suspension system isolates a vehicle chassis from forces imparted on the vehicle when traversing terrain by allowing the vehicle's ground contact points to move away from impacts at the terrain level and in relation to the vehicle chassis by a compressible suspension movement. The compressible suspension movement that isolates a chassis from these impacts is called suspension displacement or suspension travel. Compressible suspension travel has a beginning point where the suspension is in a completely uncompressed state (the suspension is uncompressed), and an ending point of displacement, where the suspension is in a completely compressed state (the suspension is fully compressed). Suspension travel displacement is measured in a direction parallel to and against gravity. As a suspension system using certain embodiments the invention is compressed, a shock absorber is compressed. As the shock absorber is compressed, the force output from the unit rises. Pivots of a suspension system of the invention are named after a component that connects with the pivot. A pivot may be fixed or floating. A fixed pivot maintains a position relative to the frame of the vehicle when the suspension is compressed. A floating pivot changes its position relative to the frame of the vehicle when the suspension is compressed. A suspended wheel has a compressible wheel suspension travel distance that features a beginning travel point where the suspension is completely uncompressed to a point where no further suspension extension can take place, and an end travel point where a suspension is completely compressed to a point where no further suspension compression can take place. At the beginning of the wheel suspension travel distance, when the suspension is in a completely uncompressed state, the shock absorber is in a state of least compression, and the suspension is easily compressed. As the suspended wheel moves compressively, shock absorber force at the wheel changes in relation to shock absorber force multiplied by a leverage ratio, where a leverage ratio is the ratio of compressive wheel travel divided by shock absorber compression over an identical given wheel travel distance.

5.1 The Drawings Illustrate Examples of Certain Embodiments of the Invention

The Figures in this disclosure use the following numbers and terms; wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17); rear hub (18); brake mount (19); pivot bearing (20); pivot axle (21); thru axle (22)

FIG. 1 presents a design for a suspension according to certain embodiments of the current invention via a two-dimensional side view. Shown in FIG. 1 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 1. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 1. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The brake link 2 is attached to a shock absorber 12 via a first shock pivot 8. The shock absorber 12 is mounted to the frame 11 via a second shock pivot 9. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 2:
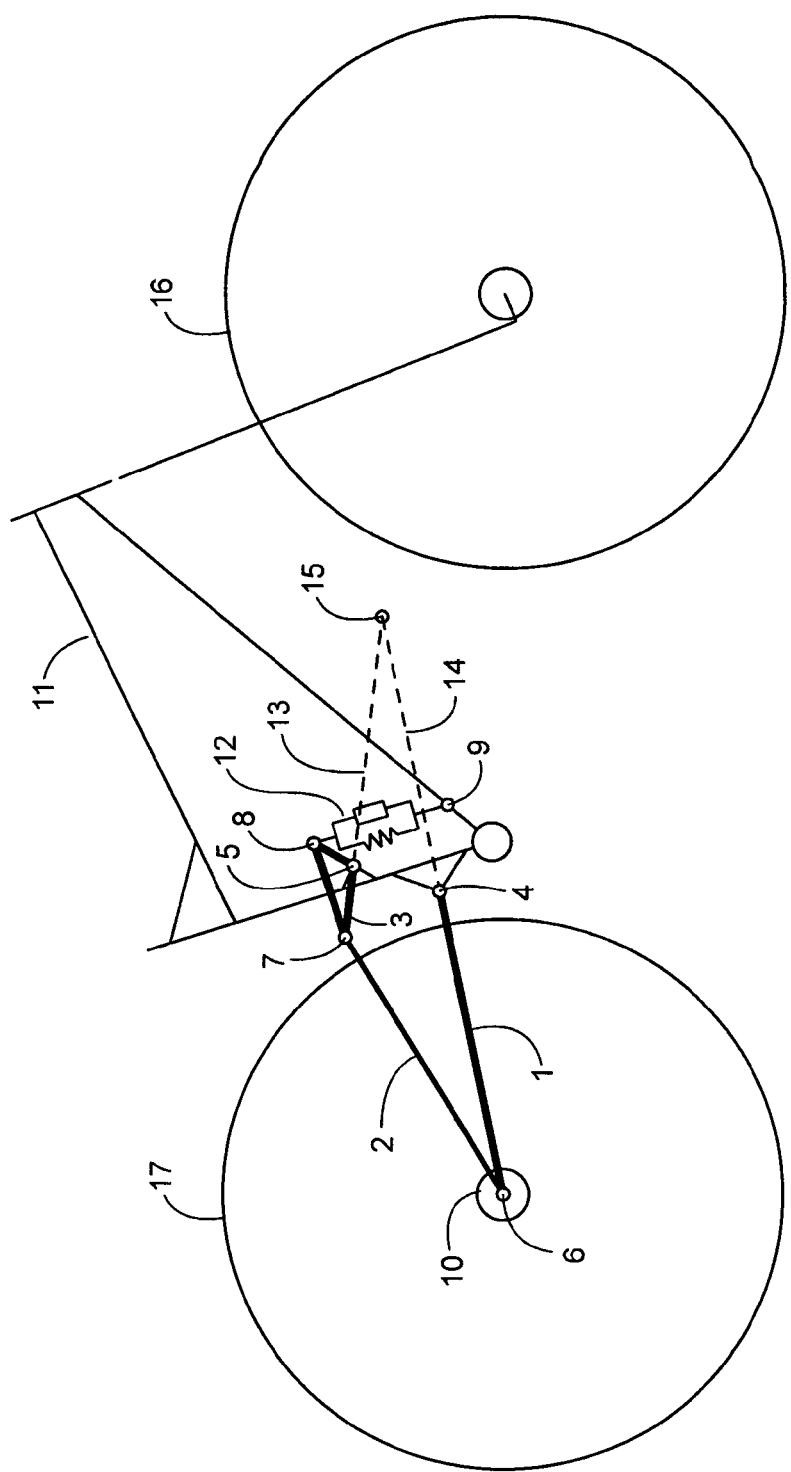
FIG. 2 shows a diagrammatical side view of a vehicle using a wheel suspension system that according to certain embodiments of the current invention. The vehicle is shown with the wheel suspension system in an uncompressed state.

FIG. 2 presents a design for a suspension according to certain embodiments of the current invention via a two-dimensional side view. Shown in FIG. 2 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 2. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 2. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the frame 11 via a second shock pivot 9. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 3:
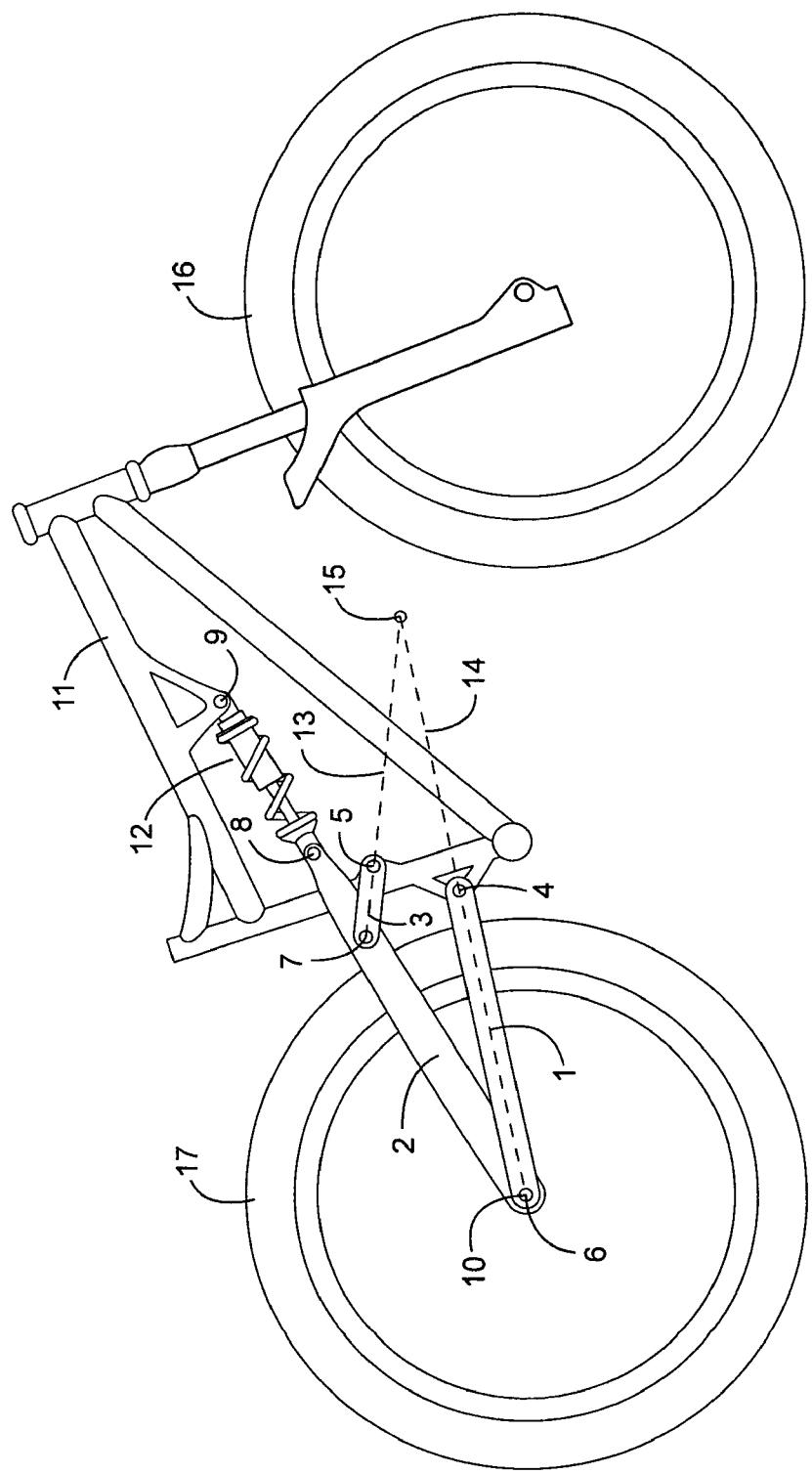
FIG. 3 shows a side view of a bicycle using the wheel suspension system shown in FIG. 1.

FIG. 3 presents a design as shown in FIG. 1 for a suspension according to certain embodiments of the current invention via a two-dimensional side view. FIG. 3 shows a representation of a frame structure and a suspension of the invention that could be used in a bicycle application. Shown in FIG. 3 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17).

Figure 4:
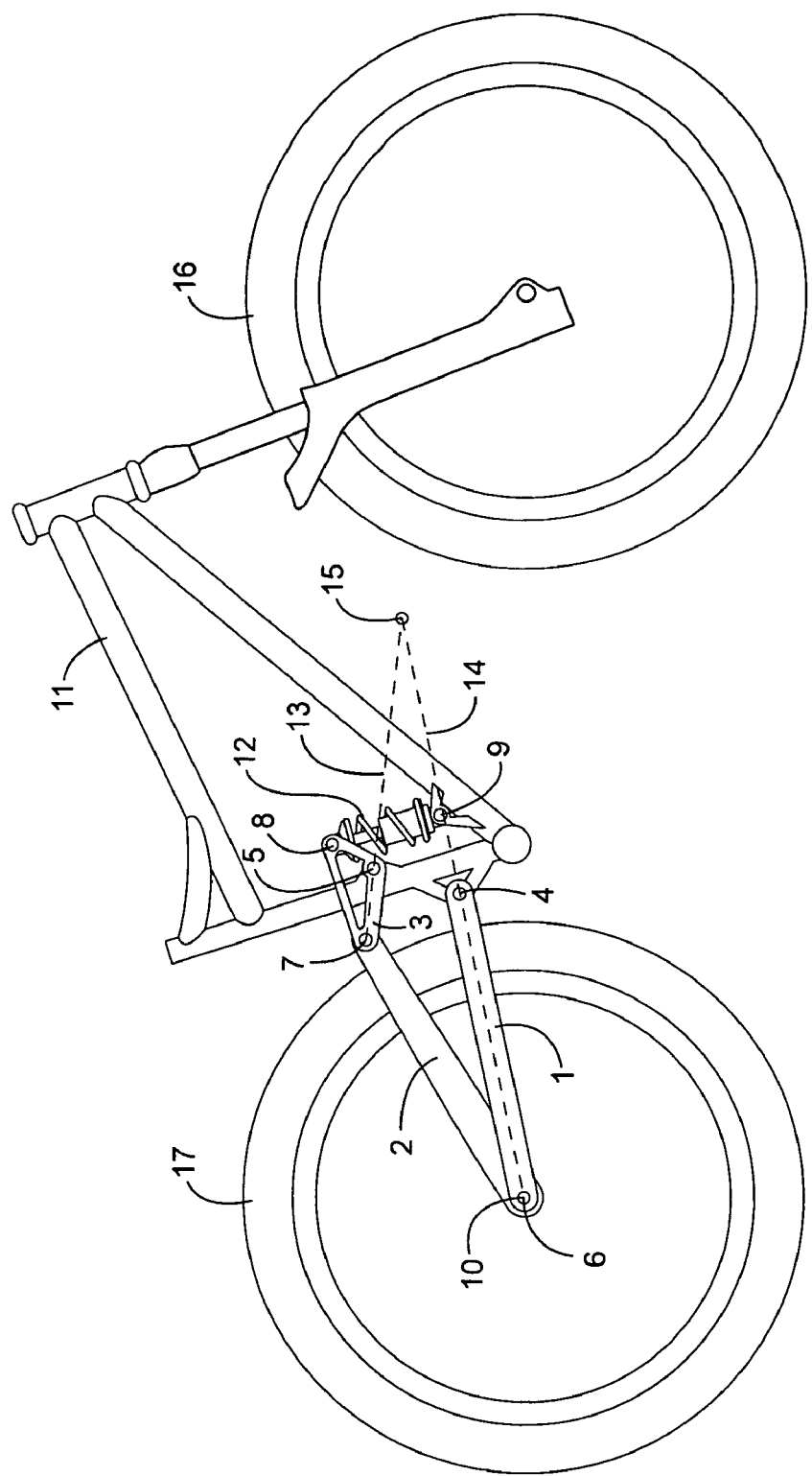
FIG. 4 shows a side view of a bicycle using the wheel suspension system shown in FIG. 2.

FIG. 4 presents a design as shown in FIG. 2 for a suspension according to certain embodiments of the current invention via a two-dimensional side view. FIG. 4 shows a representation of a frame structure and a suspension of the invention that could be used in a bicycle application. Shown in FIG. 4 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17).

Figure 5:
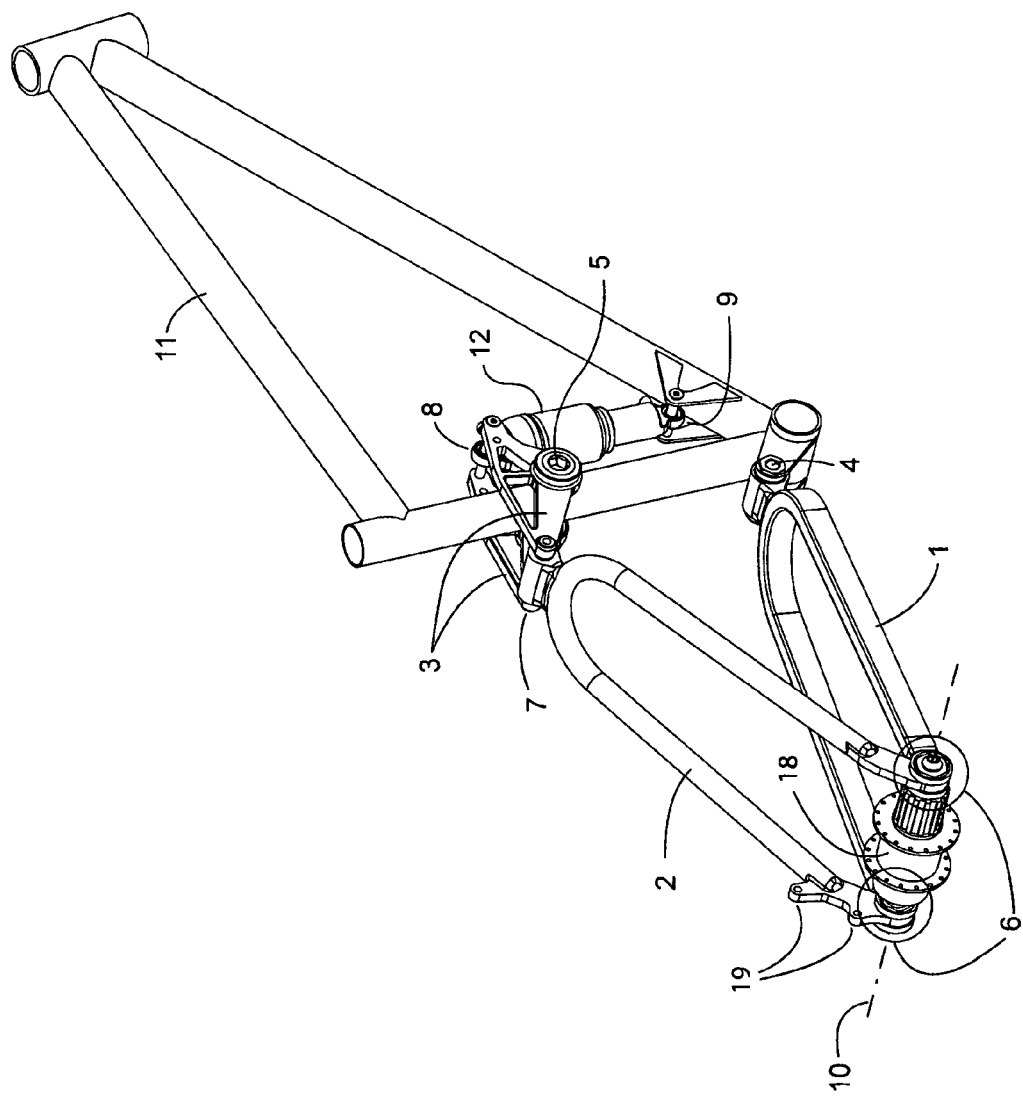
FIG. 5 shows a three dimensional view of a bicycle using the wheel suspension system shown in FIG. 2 and FIG. 4.

FIG. 5 presents a design as shown in FIG. 2 and FIG. 4 for a suspension according to certain embodiments of the current invention via a three-dimensional view. FIG. 5 shows a representation of a frame structure and a suspension of the invention that could be used in a bicycle application. Shown in FIG. 5 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); rear hub (18); brake mount (19). A frame 11 provides the structure for the vehicle. The frame 11 depicts a tubular structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. In the embodiment presented in FIG. 5, the wheel link fixed pivot 4 comprises a clevis that is a structural component of the frame 11, and a hitch to be received by the clevis, where the hitch is a structural component of the wheel link 1. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. The rear hub 18 is a structural component of the rear wheel 17 shown in FIGS. 1, 2, 3, and 4. The rear hub 17 and rear wheel 17 share a wheel rotation axis 10 which is concentrically located to the wheel link floating pivot 6. The wheel floating link pivot 6 pivotally connects the wheel link 1 to a brake link 2. In the embodiment presented in FIG. 5, the wheel link floating pivot 6 comprises a pair of clevis that is are structural components of wheel link 1, and a pair of hitches to be received by the clevises, where the hitches are structural components of the brake link 2. A brake caliper or cantilever brake or V-brake is attached to the brake link 2 so that an operator can slow the vehicle. In the embodiment presented in FIG. 5, a disc brake caliper can be bolted to a brake mount 19. The disc brake caliper will clamp on a disc brake rotor that is attached to the rear hub so that braking force can travel through the hub, through spokes or a wheel, to a tire and be transferred to the ground. Another design for the brake system is to use cantilever brakes or V-Brakes, where the brakes are mounted to the brake link 2 via posts that project from the brake link. The cantilever brakes or V-brakes then use a pad that can be clamped onto the wheel and slow the wheel down. Force from the brake will be transferred directly into the brake link 2, and the brake link 2 will transmit force to the frame 11 via the control link 3 and wheel link 1. In the embodiment presented in FIG. 5, the control link 3 is shown as two separate parts that together control the brake link 2 movements. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the frame 11 via a second shock pivot 9.

Figure 6:
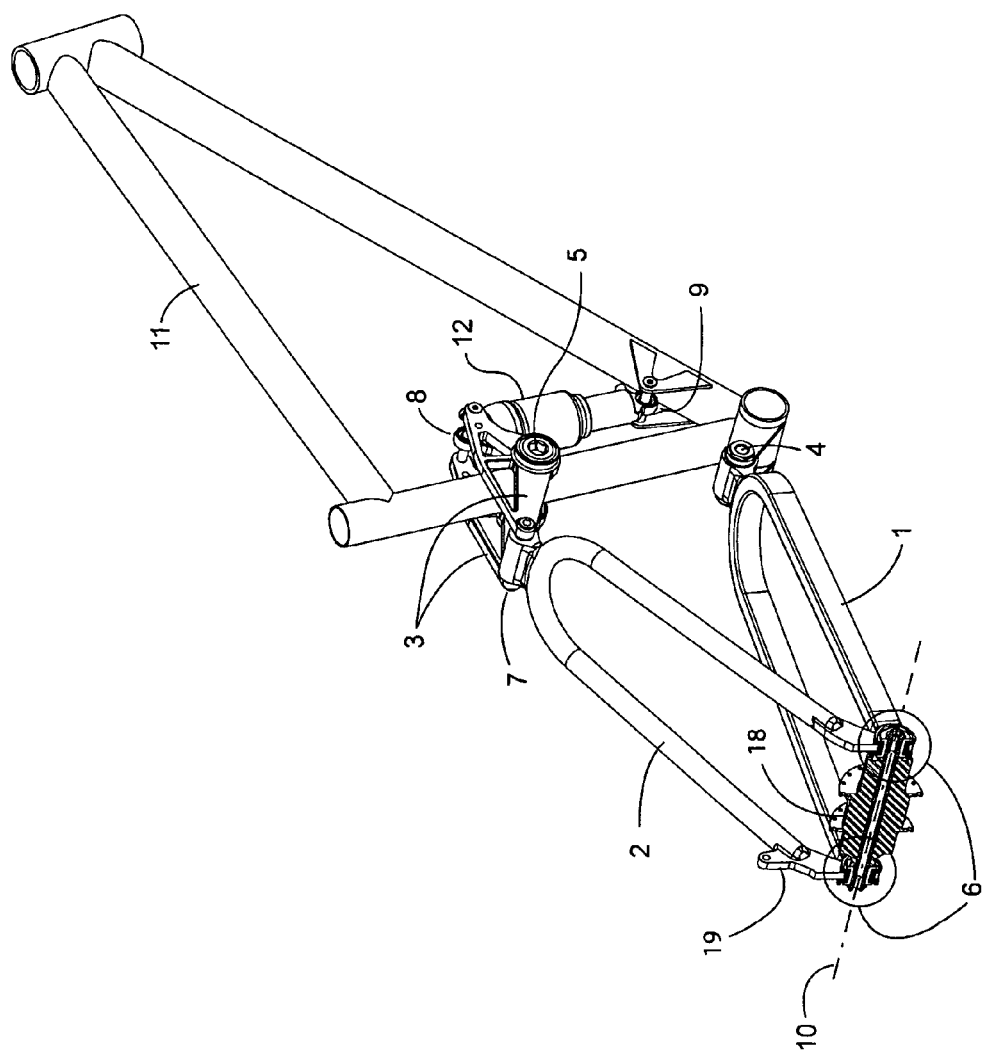
FIG. 6 shows a three dimensional view of a bicycle using the wheel suspension system shown in FIG. 2, FIG. 4, and FIG. 5, with a cutaway view of a critical area.

FIG. 6 presents a design as shown in FIG. 2, 4, and FIG. 5 for a suspension according to certain embodiments of the current invention via a three-dimensional view. FIG. 6 shows a representation of a frame structure and a suspension of the invention that could be used in a bicycle application. Shown in FIG. 6 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); rear hub (18); brake mount (19). A cutaway view of the rear hub 18 and wheel link floating pivot 6 is shown for locational purposes for reference when viewing FIG. 7.

Figure 7:
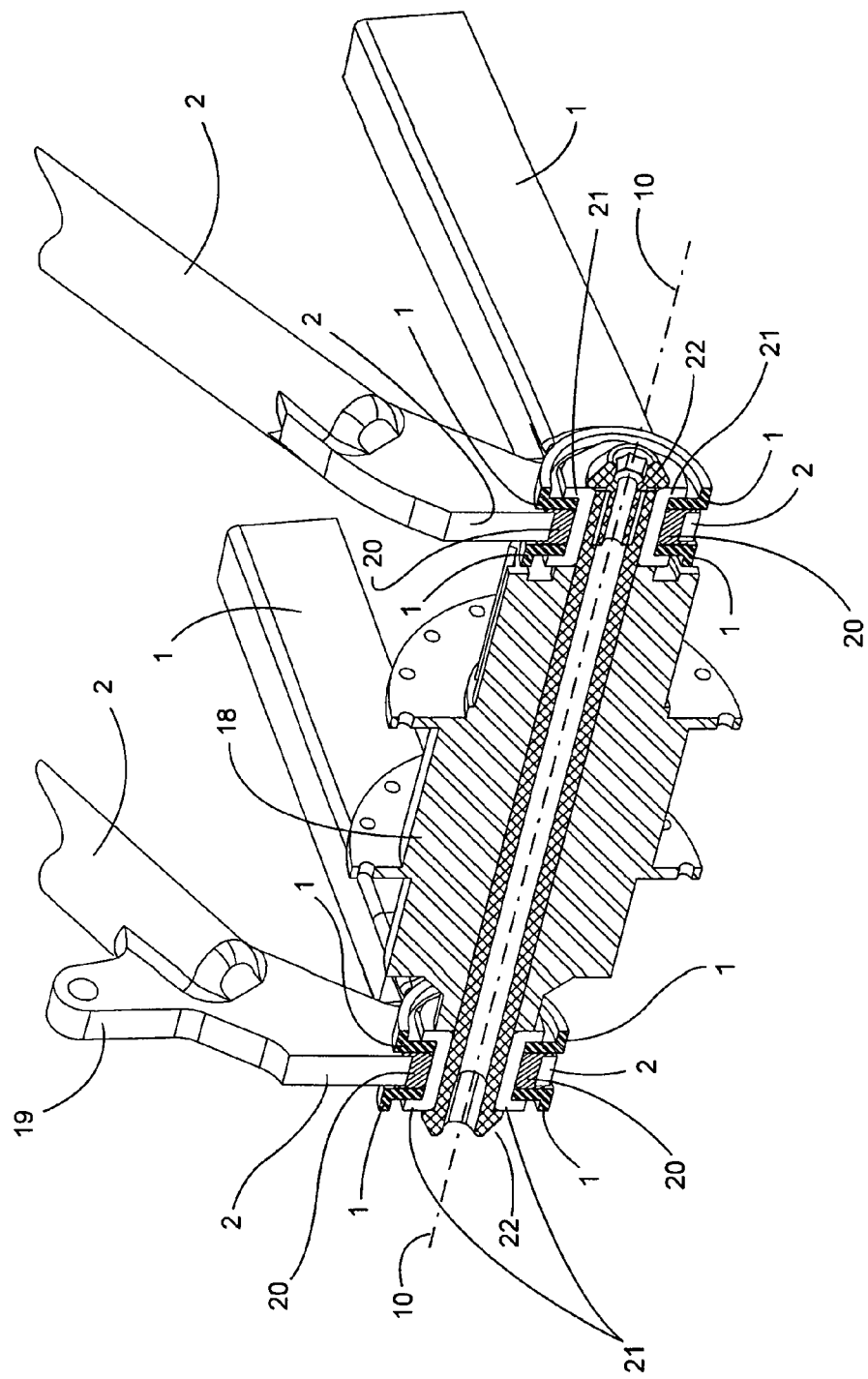
FIG. 7 shows a three dimensional cutaway view of a wheel link pivot of a bicycle using the wheel suspension system shown in FIG. 2, FIG. 4, FIG. 5, and FIG. 6, with a cutaway view of a critical area according to certain embodiments of the invention.

FIG. 7 shows a three-dimensional cutaway view of a wheel link floating pivot 6 as shown in FIG. 2, 4, 5 and FIG. 6 for a suspension according to certain embodiments of the current invention. FIG. 7 shows a representation of a frame structure and a suspension of the invention that could be used in a bicycle application. Shown in FIG. 7 are the following: wheel link (1); brake link (2); control link (3); wheel rotation axis (10); rear hub (18); brake mount (19); pivot bearing (20); pivot axle (21); thru axle (22). Certain embodiments of the wheel link floating pivot 6 can comprise a pivot bearing 20, which allows for the independent rotation of the brake link 2 and wheel link 1 around a hub rotation axis 10. The rotation of the wheel link 1 and brake link 2 can be concentric to the hub rotation axis 10. A pivot bearing 20 can be a singular or multiple of a bushing, a DU bushing, a DX bushing, an IGUS bushing, a bearing, a ball bearing, a needle bearing, a roller bearing, a flexure, or other components intended to allow independent movement of the wheel link 1 and brake link 2 in at least one degree of freedom. A pivot axle 21 acts as a bearing surface for the pivot bearing 20. The pivot axle 21 can comprise singular or multiple parts. The pivot axle 21 can have a hole through it where it can receive a thru axle 22. The thru axle 22 can comprise singular or multiple parts. The thru axle 22 can be used to mount the rear hub 18 concentric to the wheel link floating pivot 6, yet still allow removal of the rear hub 18 for convenience. A thru axle 22 can comprise a solid axle, a thru axle, a hollow axle, a QR, a quick release, a skewer, a quick release skewer, a through bolt, or other components intended to allow rear hub 18 rotation around a wheel rotation axis 10. The rear hub 18 is shown as a solid part for simplicity of illustration, where in reality it rotates on ball bearings that allow independent rotation of the rear hub 18 and rear wheel in relation to the thru axle 22 and concentric to the wheel rotation axis 10. A disc brake rotor can be attached to the rear hub 18 so that braking force can travel through the rear hub 18, through spokes and or a wheel, to a tire and be transferred to the ground.

5.2 Wheel Links of Suspension Systems of the Invention

A suspension system of the current invention, in certain embodiments, comprises a wheel link, or two, three, four, five or more wheel links. A wheel link, in certain embodiments, is connected to a wheel link floating pivot and/or a wheel link fixed pivot. In certain embodiments, a wheel link is located below (in other words, closer to the ground than) a brake link, a control link floating pivot, a control link, a first shock pivot, a shock absorber, an instant force center and/or a second shock pivot, or any one or more of these components, of a suspension system according to the invention when the suspension is uncompressed and the vehicle is on even ground when even ground is perpendicular to gravity. In certain other embodiments, a suspension system of the invention comprises a wheel link that is the same length or about the same length as a brake link of that suspension system. In certain other embodiments, a suspension system of the invention comprises a wheel link that is 5 percent or about 5 percent longer or shorter than a brake link of that suspension system, or 10 percent or about 10 percent longer or shorter, or 20 percent or about 20 percent longer or shorter, or 30 percent or about 30 percent longer or shorter, or 5 to 20 percent longer or shorter, or 5 to 50 percent longer or shorter, or 5 to 100 percent longer or shorter, or 5 to 200 percent longer or shorter, or 5 to 500 percent longer or shorter. In certain other embodiments, a wheel link of the invention is 2 to 50 centimeters (cm) in length, or 30 to 45 cm, or 35 to 40 cm. In certain other embodiments, a suspension system of the invention comprises a wheel link that is the same diameter or about the same diameter as a brake link of that suspension system. In certain other embodiments, a suspension system of the invention comprises a wheel link that is 5 percent or about 5 percent larger or smaller in diameter than a brake link of that suspension system, or 10 percent or about 10 percent larger or smaller in diameter, or 20 percent or about 20 percent larger or smaller in diameter, or 30 percent or about 30 percent larger or smaller in diameter, or 5 to 20 percent larger or smaller in diameter. In certain other embodiments, a wheel link of the invention is 0.5 to 5 cm in diameter, or 1 to 4 cm, or 1.5 to 3 cm, or 2 to 2.5 cm.

5.3 Brake Links of Suspension Systems of the Invention

A suspension system of the current invention, in certain embodiments, comprises a brake link, or two, three, four, five or more brake links. A brake link, in certain embodiments, is connected to a wheel link floating pivot, a control link floating pivot and/or a first shock pivot. In certain embodiments, a brake link is located above (in other words, further from the ground than) a wheel link of a suspension system according to the invention when the suspension is uncompressed and the vehicle is on even ground when even ground is perpendicular to gravity. In certain embodiments, a brake link is located below (in other words, closer to the ground than) a control link floating pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain other embodiments, a suspension system of the invention comprises a brake link that is the same length or about the same length as a wheel link of that suspension system. In certain other embodiments, a suspension system of the invention comprises a brake link that is 5 percent or about 5 percent longer or shorter than a wheel link of that suspension system, or 10 percent or about 10 percent longer or shorter, or 20 percent or about 20 percent longer or shorter, or 30 percent or about 30 percent longer or shorter, or 5 to 20 percent longer or shorter, or 5 to 50 percent longer or shorter, or 5 to 100 percent longer or shorter, or 5 to 200 percent longer or shorter, or 5 to 500 percent longer or shorter. In certain other embodiments, a brake link of the invention is 2 to 100 cm in length, or 35 to 55 cm, or 40 to 50 cm. In certain other embodiments, a suspension system of the invention comprises a brake link that is the same diameter or about the same diameter as a wheel link of that suspension system. In certain other embodiments, a suspension system of the invention comprises a brake link that is 5 percent or about 5 percent larger or smaller in diameter than a wheel link of that suspension system, or 10 percent or about 10 percent larger or smaller in diameter, or 20 percent or about 20 percent larger or smaller in diameter, or 30 percent or about 30 percent larger or smaller in diameter, or 5 to 20 percent larger or smaller in diameter. In certain other embodiments, a brake link of the invention is 0.5 to 5 cm in diameter, or 1 to 4 cm, or 1.5 to 3 cm, or 2 to 2.5 cm.

In certain other embodiments, a brake link and a wheel link of a suspension system of the invention are arranged relative to each other in a non-parallel manner when observed from side of the vehicle comprising the suspension system. In certain embodiments, a brake link and a wheel link are arranged relative to each other at an angle of 0 to 150 degrees, or 0 to 100 degrees, or 0 to 80 degrees, or 10 to 60 degrees, or 15 to 40 degrees, or 20 to 30 degrees, when observed from the side of the vehicle, while the suspension of said vehicle is uncompressed and the vehicle is on even ground when even ground is perpendicular to gravity. In certain other embodiments, a brake link passes on a side of a frame member or on two sides of a frame member.

5.4 Control Links of Suspension Systems of the Invention

A suspension system of the current invention, in certain embodiments, comprises a control link, or two, three, four, five or more control links. A control link of a suspension system of the invention, in certain embodiments, is connected to a brake link. In certain other embodiments, a control link is connected to a control link floating pivot, a brake link and/or a control link fixed pivot. In certain other embodiments, a control link passes on a side of a frame member or on two sides of a frame member. In certain embodiments, a control link is located above a wheel link, a wheel link floating pivot, a wheel link fixed pivot, a first shock pivot, a shock absorber, a second shock pivot, a control link fixed pivot, and/or an instant force center, or any one or more of these components, of a suspension system according to the invention when the suspension is uncompressed and the vehicle is on even ground when even ground is perpendicular to gravity. In certain embodiments, a control link is located below a control link floating pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain other embodiments, a control link of the invention is 0.5 to 5 cm in diameter, or 1 to 4 cm, or 1.5 to 3 cm, or 2 to 2.5 cm. In certain other embodiments, a suspension system of the invention comprises a control link with a length that is 2 percent or about 2 percent of the length of a wheel link of that suspension system, or 5 percent or about 5 percent longer or shorter, or 10 percent or about 10 percent longer or shorter, or 20 percent or about 20 percent longer or shorter, or 30 percent or about 30 percent longer or shorter, or 2 to 20 percent longer or shorter, or 2 to 50 percent longer or shorter, or 2 to 100 percent longer or shorter, or 2 to 200 percent longer or shorter, or 2 to 500 percent longer or shorter. In certain other embodiments, a control link of the invention is 1 to 50 cm in length, or 2 to 25 cm, or 8 to 15 cm.

5.5 Wheel Link Fixed Pivots of Suspension Systems of the Invention

A suspension system of the current invention, in certain embodiments, comprises a wheel link fixed pivot, or two, three, four, five or more wheel link fixed pivots. In certain embodiments, a wheel link fixed pivot of a suspension system of the invention is located below a control link floating pivot, a first shock pivot, a shock absorber, a second shock pivot, a control link, a control link fixed pivot, a wheel link floating pivot, and/or an instant force center, or any one or more of these components, of a suspension system according to the invention when the suspension is uncompressed and the vehicle is on even ground when even ground is perpendicular to gravity. In certain embodiments, a wheel link fixed pivot of a suspension system of the invention is located above a second shock pivot, a wheel link floating pivot, and/or an instant force center, or any one or more of these components, of a suspension system according to the invention when the suspension is uncompressed and the vehicle is on even ground when even ground is perpendicular to gravity.

5.6 Control Link Fixed Pivots of Suspension Systems of the Invention

A suspension system of the current invention, in certain embodiments, comprises a control link fixed pivot, or two, three, four, five or more control link fixed pivots. In certain embodiments, a control link fixed pivot of a suspension system of the invention is located below a control link floating pivot, a first shock pivot, a shock absorber, a second shock pivot, a control link, a wheel link floating pivot, and/or an instant force center, or any one or more of these components, of a suspension system according to the invention when the suspension is uncompressed and the vehicle is on even ground when even ground is perpendicular to gravity. In certain embodiments, a control link fixed pivot of a suspension system of the invention is located above a second shock pivot, a wheel link floating pivot, a wheel link fixed pivot, a wheel link, a brake link, and/or an instant force center, or any one or more of these components, of a suspension system according to the invention when the suspension is uncompressed and the vehicle is on even ground when even ground is perpendicular to gravity.

5.7 Wheel Link Floating Pivots of Suspension Systems of the Invention

A suspension system of the current invention, in certain embodiments, comprises a wheel link floating pivot, or two, three, four, five or more wheel link floating pivots. In certain embodiments, a wheel link floating pivot of a suspension system of the invention is concentric with a wheel rotation axis of the vehicle, preferably the wheel rotation axis of a driven wheel, a rear wheel, a front wheel, or a suspended wheel of the vehicle. In certain other embodiments, a wheel link floating pivot is nearly concentric with a wheel rotation axis of the vehicle, preferably the wheel rotation axis of a driven wheel, a rear wheel, a front wheel, or a suspended wheel of the vehicle. A wheel link floating pivot is nearly concentric with a wheel rotation axis if the axis the pivot turns around is within 2 cm of the wheel rotation axis, or within 5 cm, or within 10 cm, or within 15 cm, or when the wheel axis and pivot axis are from 2 to 20 cm away from each other, or from 5 to 15 cm, or from 5 to 10 cm.

In certain embodiments, a wheel link floating pivot of a suspension system of the invention is located below a wheel link, a brake link, a wheel link fixed pivot, a control link floating pivot, a control link, a control link fixed pivot, a first shock pivot, a shock absorber, a second shock pivot, and/or an instant force center, or any one or more of these components, of a suspension system according to the invention when the suspension is uncompressed and the vehicle is on even ground when even ground is perpendicular to gravity. In certain embodiments, a wheel link floating pivot of a suspension system of the invention is located above a wheel link, a wheel link fixed pivot, a second shock pivot, and/or an instant force center, or any one or more of these components, of a suspension system according to the invention when the suspension is uncompressed and the vehicle is on even ground when even ground is perpendicular to gravity.

5.8 Control Link Floating Pivots of Suspension Systems of the Invention

A suspension system of the current invention, in certain embodiments, comprises a control link floating pivot, or two, three, four, five or more control link floating pivots. In certain embodiments, a control link floating pivot of a suspension system of the invention is located below a control link fixed pivot, a first shock pivot, a shock absorber, a second shock pivot, a control link, a wheel link floating pivot, and/or an instant force center, or any one or more of these components, of a suspension system according to the invention when the suspension is uncompressed and the vehicle is on even ground when even ground is perpendicular to gravity. In certain embodiments, a control link floating pivot of a suspension system of the invention is located above a wheel link floating pivot, a wheel link, a brake link, a wheel link fixed pivot, a control link fixed pivot, a control link, a first shock pivot, a shock absorber, a second shock pivot, and/or an instant force center, or any one or more of these components, of a suspension system according to the invention when the suspension is uncompressed and the vehicle is on even ground when even ground is perpendicular to gravity.

5.9 First Shock Pivots of Suspension Systems of the Invention

A suspension system of the current invention, in certain embodiments, comprises a first shock pivot, or two, three, four, five or more first shock pivots. In certain embodiments, a first shock pivot of a suspension system of the invention is located below a control link floating pivot, a control link fixed pivot, a shock absorber, and/or a second shock pivot, or any one or more of these components, of a suspension system according to the invention when the suspension is uncompressed and the vehicle is on even ground when even ground is perpendicular to gravity. In certain embodiments, a first shock pivot of a suspension system of the invention is located above a wheel link floating pivot, a wheel link, a brake link, a wheel link fixed pivot, a control link fixed pivot, a control link floating pivot, a control link, a shock absorber, a second shock pivot, and/or an instant force center, or any one or more of these components, of a suspension system according to the invention when the suspension is uncompressed and the vehicle is on even ground when even ground is perpendicular to gravity.

5.10 Second Shock Pivots of Suspension Systems of the Invention

A suspension system of the current invention, in certain embodiments, comprises a second shock pivot, or two, three, four, five or more second shock pivots. In certain embodiments, a second shock pivot of a suspension system of the invention is located below a wheel link floating pivot, a wheel link, a brake link, a wheel link fixed pivot, a control link fixed pivot, a control link floating pivot, a control link, a shock absorber, and/or an instant force center, or any one or more of these components, of a suspension system according to the invention when the suspension is uncompressed and the vehicle is on even ground when even ground is perpendicular to gravity. In certain embodiments, a second shock pivot of a suspension system of the invention is located above a wheel link floating pivot, a wheel link, a brake link, a wheel link fixed pivot, a control link fixed pivot, a control link floating pivot, a control link, a shock absorber, and/or an instant force center, or any one or more of these components, of a suspension system according to the invention when the suspension is uncompressed and the vehicle is on even ground when even ground is perpendicular to gravity.

5.11 Wheel Rotation Axis of Suspension Systems of the Invention

A suspension system of the current invention, in certain embodiments, comprises a wheel rotation axis, or two or more wheel rotation axes. In certain embodiments, a wheel rotation axis of a suspension system of the invention is concentric with a wheel link floating pivot of the vehicle, preferably the wheel rotation axis of a rear wheel of the vehicle. In certain other embodiments, a wheel rotation axis is nearly concentric with a wheel link floating pivot of the vehicle. A wheel rotation axis is nearly concentric with a wheel link floating pivot if the axis the pivot turns around is within 2 cm of the wheel rotation axis, or within 5 cm, or within 10 cm, or within 15 cm, or when the wheel axis and pivot axis are from 2 to 20 cm away from each other, or from 5 to 15 cm, or from 5 to 10 cm.

In certain embodiments, a wheel rotation axis of a suspension system of the invention is located below a wheel link, a brake link, a wheel link fixed pivot, a control link floating pivot, a control link, a control link fixed pivot, a first shock pivot, a shock absorber, a second shock pivot, and/or an instant force center, or any one or more of these components, of a suspension system according to the invention when the suspension is uncompressed and the vehicle is on even ground when even ground is perpendicular to gravity. In certain embodiments, a wheel rotation axis of a suspension system of the invention is located above a wheel link, a wheel link fixed pivot, a second shock pivot, and/or an instant force center, or any one or more of these components, of a suspension system according to the invention when the suspension is uncompressed and the vehicle is on even ground when even ground is perpendicular to gravity.

5.12 Shock Absorbers of Suspension Systems of the Invention

A suspension system of the current invention, in certain embodiments, comprises a shock absorber, or two, three, four, five or more shock absorbers. A shock absorber, in certain embodiments, may be a damper, a spring, a compression gas spring, a leaf spring, a coil spring, or a fluid. In certain embodiments, a shock absorber of a suspension system of the invention is located below a control link floating pivot, a control link fixed pivot, a first shock pivot, and/or a second shock pivot, or any one or more of these components, of a suspension system according to the invention when the suspension is uncompressed and the vehicle is on even ground when even ground is perpendicular to gravity. In certain embodiments, a shock absorber of a suspension system of the invention is located above a wheel link floating pivot, a wheel link, a brake link, a wheel link fixed pivot, a control link fixed pivot, a control link floating pivot, a control link, a first shock pivot, a second shock pivot, and/or an instant force center, or any one or more of these components, of a suspension system according to the invention when the suspension is uncompressed and the vehicle is on even ground when even ground is perpendicular to gravity.

5.13 Control Link Force Lines of Suspension Systems of the Invention

A suspension system of the current invention, in certain embodiments, comprises a control link force line, or two, three, four, five or more control link force lines. In certain embodiments, a control link force line projects through a control link fixed pivot and a control link floating pivot of a suspension system of the invention. A control link force line, in certain embodiments, is parallel or substantially parallel to the ground, or at an angle of minus 60 to plus 60 degrees, or minus 45 to plus 45 degrees, or minus 30 to plus 30 degrees, or minus 15 to plus 15 degrees, or minus 10 to plus 10 degrees, or minus 5 to plus 5 degrees relative to the ground, when the suspension is uncompressed and the vehicle is on even ground when even ground is perpendicular to gravity. In certain other embodiments, a control link force line descends from the rear to the front of the vehicle at an angle of 0 to 90 degrees, or 0 to 50 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line ascends from the rear to the front of the vehicle at an angle of 0 to 90 degrees, or 0 to 50 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line descends from the rear to the front of the vehicle at an angle of 0 to 90 degrees, or 0 to 60 degrees, or 10 to 90 degrees, or 30 to 80 degrees, or 50 to 80 degrees, or 60 to 80 degrees, when the vehicle is on even ground when even ground is perpendicular to gravity and the suspension is fully compressed. In certain embodiments, a control link force line projects from the rear to the front of the vehicle at an angle of −90 to 90 degrees, −50 to 50 degrees, 0 to 90 degrees, or 0 to 60 degrees, or 1 to 50 degrees, or 2 to 20 degrees, or 2 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line projects from the rearward in relation to the driven wheel at an angle of −90 to 90 degrees, −50 to 50 degrees, 0 to 90 degrees, or 0 to 60 degrees, or 1 to 50 degrees, or 2 to 20 degrees, or 2 to 10 degrees, or 5 to 15 degrees, or 10 to 20 degrees, or 20 to 30 degrees, when the suspension is uncompressed and the vehicle is on even ground when even ground is perpendicular to gravity.

5.14 Wheel Link Force Lines of Suspension Systems of the Invention

A suspension system of the current invention, in certain embodiments, comprises a wheel link force line, or two, three, four, five or more wheel link force lines. In certain embodiments, a wheel link force line projects through a wheel link fixed pivot and a wheel link floating pivot of a suspension system of the invention. A wheel link force line, in certain embodiments, is parallel or substantially parallel to the ground, or at an angle of minus 60 to plus 60 degrees, or minus 45 to plus 45 degrees, or minus 30 to plus 30 degrees, or minus 15 to plus 15 degrees, or minus 10 to plus 10 degrees, or minus 5 to plus 5 degrees relative to the ground, when the suspension is uncompressed and the vehicle is on even ground when even ground is perpendicular to gravity. In certain other embodiments, a wheel link force line descends from the rear to the front of the vehicle at an angle of 0 to 90 degrees, or 0 to 50 degrees, or 0 to 30 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a wheel link force line ascends from the rear to the front of the vehicle at an angle of 0 to 90 degrees, or 0 to 50 degrees, or 0 to 30 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a wheel link force line descends from the rear to the front of the vehicle at an angle of 10 to 90 degrees, or 30 to 80 degrees, or 50 to 80 degrees, or 60 to 80 degrees, when the vehicle is on even ground when even ground is perpendicular to gravity and the suspension is fully compressed. In certain other embodiments, a wheel link force line projects from the rear to the front of the vehicle at an angle of −90 to 90 degrees, −50 to 50 degrees, −30 to 30 degrees, −15 to 45 degrees, −20 to 20 degrees, −10 to 10 degrees when the suspension is uncompressed and the vehicle is on even ground when even ground is perpendicular to gravity.

5.15 Instant Force Centers of Suspension Systems of the Invention

A suspension system of the current invention, in certain embodiments, comprises an instant force center, or two, three, four, five or more instant force centers. An instant force is a point where a control link force line of a suspension system of the invention intersects with a wheel link force line of that suspension system. In certain other embodiments, a control link force line and a wheel link force line of a suspension system of the invention intersect when the suspension is uncompressed, when the suspension is fully compressed, and/or at any point of partial compression of the suspension system. In certain other embodiments, an instant force center of a suspension system of the invention is in different locations when the suspension is uncompressed and when the suspension is fully compressed. In certain embodiments, an instant force center of a suspension system of the invention is located above a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located below a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located behind a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located further to the front of the vehicle than a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity.

In certain embodiments of a suspension of the invention, an instant force center location is governed by the angle between and location of a wheel link and control link, and the closer to parallel a wheel link and control link are, the nearer to infinity is the instant force center perpendicular distance to the ground. In certain other embodiments, an instant force center of a suspension system of the invention has a first perpendicular distance from the ground, when the ground is level and perpendicular to gravity and when the suspension is uncompressed. In certain embodiments, an instant force center of a suspension system of the invention has a second perpendicular distance from the ground when the ground is level and perpendicular to gravity, when the suspension is compressed to a point further in the travel (in other words, partially to fully compressed), for example, when the suspension is 40 percent compressed, or 50 percent, or 60 percent, or fully compressed (in other words, 100 percent compressed). In certain other embodiments, the difference between the first perpendicular distance and second perpendicular distance can vary, for example, the difference may be from 0 to infinity, or 0 to 10,000 meters (m), or 0 to 5000 m, or 0 to 2500 m, or 0 to 1000 m, or 0 to 100 m, or 0 to 10 m, or 0 to 0.5 m, or 0 to 0.2 m, 0 to 0.1 m.

5.16 Further Embodiments of the Invention

A vehicle using a suspension of the invention may, in certain embodiments, comprise a measurable suspension parameter, a link length or link lengths measured from the center of one link pivot to another, vehicle metrics, a frame, a moving suspension component, a pivot, a rotary motion device, a motion control device, and/or a power-train component.

A measurable suspension parameter and vehicle metrics, in certain embodiments, may comprise a wheelbase, track width, camber, caster, anti squat, pro squat, zero squat, squat, rake, trail, offset, fork offset, spindle offset, chainstay length, swingarm length, distance between driven wheel rotation axis and power unit output spindle axis, chain length, belt length, bottom bracket, bottom bracket offset, drive spindle, drive spindle offset, drive spindle height, wheel diameter, driven wheel diameter, driven wheel spindle height, chainstay slope, chainstay rise, center of mass, center of mass height, center of mass offset, center of mass offset from drive spindle, length, magnitude, top tube length, downtube length, front center distance, seat tube length, seatstay length, headset stack height, head tube angle, fork angle, impact angle, fork rake, crown rake, handlebar height, bar height, bar sweep, handlebar sweep, handlebar rise, bar rise, crank length, crank arm length, pitch diameter, gear pitch diameter, sprocket pitch diameter, cog pitch diameter, front gear pitch diameter, front sprocket pitch diameter, front cog pitch diameter, rear gear pitch diameter, rear sprocket pitch diameter, rear cog pitch diameter, first intermediate gear pitch diameter, second intermediate gear pitch diameter, first intermediate sprocket pitch diameter, second intermediate sprocket pitch diameter, first intermediate cog pitch diameter, second intermediate cog pitch diameter, instant center, instant force center, center of curvature, axle path, axle path center of curvature, moving center of curvature, forward moving center of curvature, forward moving instant center, rearward moving instant center, instant center movement direction change, center of curvature path, instant center path, instant center path focus, moving instant center path focus, virtual force center, virtual instant force center, virtual force center path, driving force, chain force, anti rotation force, sprocket force, bevel gear force, rotational force, driving force vector, chain pull, chain pull force, chain pull force vector, idler gear height, idler gear pitch diameter, idler cog pitch diameter, idler sprocket pitch diameter, jackshaft gear pitch diameter, jackshaft cog pitch diameter, jackshaft sprocket pitch diameter, leverage rate, leverage ratio, damper leverage rate, damper leverage ratio, spring leverage rate, spring leverage ratio, wheel motion ratio, wheel rate, spring rate, damping rate, leverage rate progression curve, leverage rate progression, progressive rate, regressive rate, straight rate, varying rate, suspension compression, full suspension compression, suspension extension, full suspension extension, droop travel, full droop travel, suspension ride height, static ride height, neighed ride height, laden ride height, weighted ride height, beginning of travel, middle of travel, end of travel, 0 percent travel to 20 percent travel, 20 percent travel to 80 percent travel, 80 percent travel to 100 percent travel, 0 percent travel to 25 percent travel, 25 percent travel to 75 percent travel, 75 percent travel to 100 percent travel, 0 percent travel to 30 percent travel, 30 percent travel to 65 percent travel, 65 percent travel to 100 percent travel, 0 percent travel to 35 percent travel, 35 percent travel to 60 percent travel, 60 percent travel to 100 percent travel, powertrain component rotation axis, driven wheel rotation axis, non driven wheel rotation axis, sprocket rotation axis, axis, axis location, rear wheel rotation axis, front wheel rotation axis, contact patch, tire contact patch, tire to ground contact patch, driven wheel tire to ground contact patch, non driven wheel tire to ground contact patch, front wheel tire to ground contact patch, rear wheel tire to ground contact patch, chain force vector, driving force vector, squat force vector, first carrier manipulation link force vector, second carrier manipulation link force vector, squat definition point, squat layout line, lower squat measurement definition line, measured squat distance, driven wheel axle path, driven wheel suspension travel distance, stable squat magnitude curve, defines a squat magnitude curve upper bound, a squat magnitude curve lower bound, instant force center, driven wheel rotation axis, chain force vector and driving force vector intersection point, driving cog rotation axis, center of the forward wheel tire to ground contact patch, center of the driven wheel tire to ground contact patch, vehicle center of sprung mass, 200 percent squat point, 200 percent measurement value, direction of gravity, squat magnitude definition point, squat magnitude, center of mass intersection vector, squat magnitude definition vector, percent squat magnitude variation, first squat magnitude curve slope, first squat magnitude curve slope, second squat magnitude curve slope, third squat magnitude curve slope, instant force center path, instant force center path focus, pitch diameter, driven idler cog rotation axis, instant force center position uncompressed, instant force center position compressed, instant force center movement, and/or an instant force center movement.

A frame, in certain embodiments, may be comprised of a solid beam, a solid bar, a metal bar, a plastic bar, a composite bar, a tube, a metal tube, an aluminum tube, a titanium tube, a steel tube, a composite tube, a carbon tube, a boron tube, an alloy tube, a magnesium tube, a stiff tube, a flexible tube, a thin walled tube, a thick walled tube, a butted tube, a single butted tube, a double butted tube, a triple butted tube, a quadruple butted tube, a straight gage tube, a round tube, a square tube, a rectangular tube, a rounded corner tube, a shaped tube, an aero tube, a streamline tube, a plus shaped tube, a bat shaped tube, a tube that transitions from a round tube to a rectangular tube, a tube that transitions from a round tube to a square tube, a tube that transitions from a round tube to a rounded corner tube, a tube that transitions from a round tube to a shaped tube, welding, MIG welding, TIG welding, laser welding, friction welding, a welded tube, a TIG welded tube, a MIG welded tube, a laser welded tube, a friction welded tube, a monocoque section, a monocoque frame, metal monocoque, TIG welded monocoque, MIG welded monocoque, laser welded monocoque, friction welded monocoque, carbon monocoque, Kevlar monocoque, fiberglass monocoque, composite monocoque, fiberglass, carbon fiber, foam, honeycomb, stress skin, braces, extrusion, extrusions, metal inserts, rivets, screws, castings, forgings, CNC machined parts, machined parts, stamped metal parts, progressive stamped metal parts, tubes or monocoque parts welded to cast parts, tubes or monocoque parts welded to forged parts, tubes or monocoque parts welded to machined parts, tubes or monocoque parts welded to CNC machined parts, glue, adhesive, acrylic adhesive, methacrylate adhesive, bonded panels, bonded tubes, bonded monocoque, bonded forgings, bonded castings, tubes bonded to CNC machined parts, tubes bonded to machined parts, tubes bonded to castings, tubes bonded to forgings, gussets, supports, support tubes, tabs, bolts, tubes welded to tabs, monocoque welded to tabs, tubes bolted to tabs, injection molded parts, seatstays, chainstays, a seatstay, a chainstay, a seat tube, seat tower, seatpost, seat, top tube, upper tube, downtube, lower tube, top tubes, down tubes, seat tube brace, and/or a seat tube support.

A moving suspension component of a suspension system of the invention, according to certain embodiments, may be comprised of a link, a wheel carrier link, a wheel carrier, a carrier manipulation link, an upper carrier manipulation link, lower carrier manipulation link, first carrier manipulation link, second carrier manipulation link, swingarm, swingarms, swinging arm, swinging arms, swing link, swing links, first link, second link, upper link, lower link, top link, bottom link, forward link, rearward link, front link, back link, primary link, secondary link, flexure, flexures, first flexure, second flexure, upper flexure, lower flexure, top flexure, bottom flexure, forward flexure, rearward flexure, front flexure, back flexure, primary flexure, secondary flexure, carrier manipulation flexures, sliders, curved sliders, straight sliders, complex curved sliders, carriers, tracks, curved tracks, straight tracks, complex curved tracks, bearings, cams, gears, seals, pivots, shock link, linkages, shock driving links, A-Arms, H-Arms, support arms, upper support, lower support, double arms, single arms, single pivot, multi pivot, SLA, Short Long Arm, hub carrier, wheel carrier, spindle, spindle carrier, wheel support, spindle support, trailing arm, semi-trailing arm, swingarm, double swingarm, parallel links, semi-parallel links, perpendicular links, strut, MacPherson strut, suspension strut, linear bearing, linear bushing, stanchion, fork, fork lower, 4-bar linkage, 5-bar linkage, 6-bar linkage, 7 bar linkage, 8 bar linkage, linkage, multi link, trackbar, panhard bar, watts link, watt link, ball joints, heim joint, radial joint, rotary joint, internal damper, external damper, enclosed damper, enclosed spring, caster block, camber block, caster wedge, driven wheel, vehicle chassis, first link fixed pivot , second link fixed pivot, first link floating pivot, second link floating pivot, driving cog, driven cog, forward wheel, driven idler cog, spring damper unit, first carrier manipulation track, second carrier manipulation track, first carrier manipulation slider, second carrier manipulation slider, first carrier manipulation slider pivot, second carrier manipulation slider pivot, stiffening link, and/or a stiffening linkage.

A pivot and a rotary motion devices of a suspension of the invention, according to certain embodiments, may be comprised of a pivot, a main pivot, a chainstay pivot, a seatstay pivot, an upper main pivot, a lower frame pivot, an upper frame pivot, a bottom frame pivot, a top frame pivot, a forward frame pivot, a rearward frame pivot, a front frame pivot, a rear frame pivot, a primary frame pivot, a secondary frame pivot, a tertiary frame pivot, a first frame pivot, a second frame pivot, a third frame pivot, a fourth frame pivot, combinations of pivots, bearing pivots, bushing pivots, bearings, bushings, seals, grease ports, greased pivots, oiled pivots, needle bearing pivots, journal bearing pivots, DU bearing pivots, plastic bushing pivots, plastic bearing pivots, a flexure, flexures, composite flexures, titanium flexures, aluminum flexures, steel flexures, aluminum pivot shafts, stainless steel pivot shafts, steel pivot shafts, titanium pivot shafts, plastic pivot shafts, composite pivot shafts, hardened bearing races, hardened pivot shafts, anodized pivot shafts, plated pivot shafts, coated pivot shafts, bearing caps, bearings seals, o-rings, o-ring seals, x-rings, and/or a x-ring seal.

A motion control device of a suspension of the invention, according to certain embodiments, may be comprised of a shock, a shock absorber, a spring damper unit, a damper, a spring, a coil spring, a leaf spring, a compression spring, an extension spring, an air spring, a nitrogen spring, a gas spring, a torsion spring, a constant force spring, a flat spring, a wire spring, a carbon spring, a negative spring, a positive spring, a progressive spring, multiple springs, stacked springs, springs in series, springs in parallel, springs separate from a damper unit, a damper unit, hydraulics, hydraulic pistons, hydraulic valves, air valves, air cans, gears, cams, a cam, a gear, non-circular gears, linear damper, rotary damper, vane damper, friction damper, poppet valve, compensation spring, negative spring, elastomer, rubber bumper, bumper, progressive bumper, hydraulic bottoming bumper, pressure compensation, heat compensation, oil, water, damping fluid, cooling fluid, shims, pressure, shaft, through shaft, eyelet, adjusters, compensator, hose, reservoir, remote reservoir, low speed adjuster, high speed adjuster, mid range adjuster, bypass circuit, foot valve, large bump adjuster, small bump adjuster, high velocity adjuster, low velocity adjuster, hydraulic ram, hydraulic piston, active suspension, and/or a microprocessor.

A powertrain component of a suspension of the invention, according to certain embodiments, may be comprised of an energy storage device, a battery, fuel, a fuel tank, a flywheel, a liquid fuel, solid fuel, rocket fuel, a reactor, steam, a nuclear reactor, a fusion reactor, pressure, air pressure, hydraulic pressure, gas pressure, expanding gas, a motor, an electric motor, a hydraulic motor, a turbine motor, a steam turbine, a gas turbine motor, an engine, a gasoline engine, a diesel engine, diesel, gasoline, alcohol, sterling engine, a two stroke engine, a four stroke engine, miller cycle engine, ramjet engine, turbine engine, rocket engine, human power, horse power, animal power, potential energy, spring, compression spring, extension spring, constant force spring, progressive spring, power transfer components, wire, rope, string, chain, belt, shaft, gear, cog, cam, sprocket, pulley, lever, clutch, one way clutch, one way bearing, bearing, ball bearing, journal bearing, bushing, drive sprocket, driven sprocket, drive cog, driven cog, drive gear, driven gear, intermediate cog, intermediate sprocket, intermediate gear, idler cog, idler sprocket, idler gear, bottom bracket, bottom bracket spindle, crank arm, foot pedal, pedal, hand crank, cassette, sprocket cluster, derailleur, front derailleur, rear derailleur, chainguide, single ring chainguide, dual ring chainguide, multi ring chainguide, shifter, shift lever, shifter cable, shifter hose, hydraulic shifting, air shifting, pneumatic shifting, gearbox, transmission, continuously variable transmission, infinitely variable transmission, direct drive, tire, wheel, track, track segment, idler wheel, jet, driving cog, driven cog, forward wheel, driven idler cog.

Certain embodiments of the current invention may comprise a braking system which could further comprise disc brakes, calipers, disc caliper, hydraulic brakes, mechanical brakes, brake levers, brake hose, brake cable, brake pads, caliper brakes, rim brakes, V-brakes, cantilever brakes, friction brakes, wheel brake, mounting bolts, international brake standard mounting.

A suspension of the invention will comprise a linkage system which further comprise pivoting means concentric to a wheel rotation axis so that braking forces can be controlled by tactical placement of an instant force center, and so that acceleration forces can be controlled by the placement of a fixed pivot or pivots of a swinging wheel link.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. Throughout this application the singular includes the plural and the plural includes the singular, unless indicated otherwise. All cited publications, patents, and patent applications are herein incorporated by reference in their entirety.

What is claimed is:

1. A suspension system for a vehicle comprising a wheel link floating pivot, a control link fixed pivot, a wheel rotation axis, a wheel link, a brake link and a shock absorber, wherein said wheel link floating pivot is concentric with said wheel rotation axis; wherein said shock absorber is mounted to a link selected from the group consisting of a brake link, a control link, and a wheel link; wherein said shock absorber is selected from the group consisting of a compression gas spring, a leaf spring, a coil spring, and a fluid; and wherein force that compresses said shock absorber is transmitted through said brake link; and wherein said brake link passes on two sides of a frame member.

2. The suspension system of claim 1, said suspension system further comprising, a control link floating pivot and a wheel link fixed pivot.

3. The suspension system of claim 1, said suspension system further comprising a wheel link fixed pivot and a control link floating pivot.

4. The suspension system of claim 3, said suspension system further comprising an instant center that is further to the front of the vehicle than the shock absorber when the suspension is uncompressed.

5. The suspension system of claim 3, said suspension system further comprising an instant center that is below the shock absorber when the suspension is uncompressed.

6. The suspension system of claim 3, said suspension system further comprising an instant center that is closer to the ground when the suspension is fully compressed compared to the when the suspension is uncompressed.

7. The suspension system of claim 3, said suspension system further comprising an instant center that has a first perpendicular distance to the ground when the suspension is uncompressed and a second perpendicular distance to the ground when the suspension is compressed.

8. The suspension of claim 7, wherein the second perpendicular distance of the instant center to the ground is measured when the suspension is 50 percent compressed.

9. The suspension of claim 7, wherein the second perpendicular distance of the instant center to the ground is measured when the suspension is fully compressed.

10. The suspension of claim 7, where the difference between first perpendicular distance and second perpendicular distance is from 0 to 10000 m.

11. The suspension system of claim 3, said suspension system further comprising a control link force line that descends from the rear to the front of the vehicle at an angle of 0 to 50 degrees when the suspension is uncompressed and the vehicle is on even ground.

12. The suspension system of claim 3, said suspension system further comprising a control link force line that is at an angle of minus 30 to plus 30 degrees relative to the ground when the suspension is uncompressed and the vehicle is on even ground.

13. The suspension system of claim 3, said suspension system further comprising a wheel link force line that ascends from the rear to the front of the vehicle at an angle of 0 to 50 degrees when the suspension is uncompressed and the vehicle is on even ground.

14. The suspension system of claim 3, said suspension system further comprising a wheel link force line that is at an angle of minus 10 to plus 10 degrees relative to the ground when the suspension is uncompressed and the vehicle is on even ground.

15. The suspension system of claim 3, said suspension system further comprising a wheel link force line that projects from the rear to the front of the vehicle at an angle of −15 to 45 degrees when the suspension is uncompressed and the vehicle is on even ground.

16. The suspension system of claim 3, said suspension system further comprising a control link force line that descends from the rear to the front of the vehicle at an angle of 0 to 60 degrees when the vehicle is on even ground and the suspension is fully compressed.

17. The suspension system of claim 3, said suspension system further comprising a wheel link force line that descends from the rear to the front of the vehicle at an angle of 0 to 30 degrees when the vehicle is on even ground and the suspension is fully compressed.

18. The suspension system of claim 3, said suspension system further comprising a wheel link force line that projects from the rear to the front of the vehicle at an angle of −30 to 30 degrees when the vehicle is on even ground and the suspension is fully compressed.

19. The suspension system of claim 1, wherein said wheel link and said brake link are arranged at an angle of 10 to 60 degrees when the suspension is uncompressed and the vehicle is on even ground.

20. The suspension system of claim 1, wherein said wheel link is 5 to 20 percent shorter than said brake link.

21. The suspension system of claim 1, said suspension system further comprising a control link that is 2 to 25 cm in length.

22. A suspension system for a vehicle comprising a wheel link floating pivot, a control link fixed pivot, a wheel rotation axis, a wheel link, a brake link, a control link and a shock absorber, wherein said wheel link floating pivot is concentric with said wheel rotation axis and where said wheel link and said control link are arranged so that an instant center of the suspension system is located below the control link when the suspension is uncompressed and the vehicle is on even ground; wherein said shock absorber is mounted to a link selected from the group consisting of a brake link, a control link, and a wheel link; wherein force that compresses said shock absorber is transmitted though said brake link; wherein said shock absorber is selected from the group consisting of a compression gas spring, a leaf spring, a coil spring, and a fluid; and wherein said suspension system further comprises a wheel link fixed pivot, a control link floating pivot and a control link fixed pivot.

23. The suspension system of claim 22, said suspension system further comprising a control link floating pivot and a wheel link fixed pivot.

24. The suspension system of claim 22, said suspension system further comprising an instant center that is further to the front of the vehicle than the shock absorber when the suspension is uncompressed and the vehicle is on even ground.

25. The suspension system of claim 22, said suspension system further comprising an instant center that is below the shock absorber when the suspension is uncompressed and the vehicle is on even ground.

26. The suspension system of claim 22, said suspension system further comprising an instant center that is closer to the ground when the suspension is fully compressed compared to the when the suspension is uncompressed and the vehicle is on even ground.

27. The suspension system of claim 22, said suspension system further comprising an instant center that has a first perpendicular distance to the ground when the suspension is uncompressed and a second perpendicular distance to the ground when the suspension is compressed.

28. The suspension of claim 27, wherein the second perpendicular distance of the instant center to the ground is measured when the suspension is 50 percent compressed.

29. The suspension of claim 27, wherein the second perpendicular distance of the instant center to the ground is measured when the suspension is fully compressed.

30. The suspension of claim 27, where the difference between first perpendicular distance and second perpendicular distance is from 0 to 10000 m.

31. The suspension system of claim 22, said suspension system further comprising a control link force line that descends from the rear to the front of the vehicle at an angle of 0 to 50 degrees when the suspension is uncompressed and the vehicle is on even ground.

32. The suspension system of claim 22, said suspension system further comprising a control link force line that is at an angle of minus 30 to plus 30 degrees relative to the ground when the suspension is uncompressed and the vehicle is on even ground.

33. The suspension system of claim 22, said suspension system further comprising a wheel link force line that ascends from the rear to the front of the vehicle at an angle of 0 to 50 degrees when the suspension is uncompressed and the vehicle is on even ground.

34. The suspension system of claim 22, said suspension system further comprising a wheel link force line that is at an angle of minus 10 to plus 10 degrees relative to the ground when the suspension is uncompressed and the vehicle is on even ground.

35. The suspension system of claim 22, said suspension system further comprising a wheel link force line that projects from the rear to the front of the vehicle at an angle of −15 to 45 degrees when the suspension is uncompressed and the vehicle is on even ground.

36. The suspension system of claim 22, said suspension system further comprising a control link force line that descends from the rear to the front of the vehicle at an angle of 0 to 60 degrees when the vehicle is on even ground and the suspension is fully compressed.

37. The suspension system of claim 22, said suspension system further comprising a wheel link force line that descends from the rear to the front of the vehicle at an angle of 0 to 30 degrees when the vehicle is on even ground and the suspension is fully compressed.

38. The suspension system of claim 22, said suspension system further comprising a wheel link force line that projects from the rear to the front of the vehicle at an angle of −30 to 30 degrees when the vehicle is on even ground and the suspension is fully compressed.

39. The suspension system of claim 22, wherein said wheel link and said brake link are arranged at an angle of 10 to 60 degrees when the suspension is uncompressed and the vehicle is on even ground.

40. The suspension system of claim 22, wherein said wheel link is 5 to 20 percent shorter than said brake link.

41. The suspension system of claim 22, wherein said brake link passes on two sides of a frame member.

42. The suspension system of claim 22, wherein said control link is 2 to 25 cm in length.

43. A suspension system for a vehicle comprising a wheel link floating pivot, a control link fixed pivot, a wheel rotation axis, a wheel link, a brake link, and a shock absorber, wherein said wheel link floating pivot is concentric with said wheel rotation axis, wherein said shock absorber is selected from the group consisting of a compression gas spring, a leaf spring, a coil spring, and a fluid; and wherein force is transmitted to said shock absorber through said brake link; wherein said brake link passes on two sides of a frame member.

44. The suspension system of claim 43, said suspension system further comprising a control link.

45. The suspension system of claim 43, said suspension system further comprising a brake link, a control link floating pivot and a wheel link fixed pivot.

46. The suspension system of claim 43, said suspension system further comprising a wheel link fixed pivot and a control link floating pivot.

47. The suspension system of claim 46, said suspension system further comprising an instant center that is further to the front of the vehicle than the shock absorber when the suspension is uncompressed and the vehicle is on even ground.

48. The suspension system of claim 46, said suspension system further comprising an instant center that is below the shock absorber when the suspension is uncompressed and the vehicle is on even ground.

49. The suspension system of claim 46, said suspension system further comprising an instant center that is closer to the ground when the suspension is fully compressed compared to the when the suspension is uncompressed and the vehicle is on even ground.

50. The suspension system of claim 46, said suspension system further comprising an instant center that has a first perpendicular distance to the ground when the suspension is uncompressed and a second perpendicular distance to the ground when the suspension is compressed.

51. The suspension of claim 50, wherein the second perpendicular distance of the instant center to the ground is measured when the suspension is 50 percent compressed.

52. The suspension of claim 50, wherein the second perpendicular distance of the instant center to the ground is measured when the suspension is fully compressed.

53. The suspension of claim 46, where the difference between first perpendicular distance and second perpendicular distance is from 0 to 10000 m.

54. The suspension system of claim 46, said suspension system further comprising a control link force line that descends from the rear to the front of the vehicle at an angle of 1 to 50 degrees when the suspension is uncompressed and the vehicle is on even ground.

55. The suspension system of claim 46, said suspension system further comprising a control link force line that is at an angle of minus 30 to plus 30 degrees relative to the ground when the suspension is uncompressed and the vehicle is on even ground.

56. The suspension system of claim 46, said suspension system further comprising a wheel link force line that ascends from the rear to the front of the vehicle at an angle of 0 to 50 degrees when the suspension is uncompressed and the vehicle is on even ground.

57. The suspension system of claim 46, said suspension system further comprising a wheel link force line that is at an angle of minus 10 to plus 10 degrees relative to the ground when the suspension is uncompressed and the vehicle is on even ground.

58. The suspension system of claim 46, said suspension system further comprising a wheel link force line that projects from the rear to the front of the vehicle at an angle of −15 to 45 degrees when the suspension is uncompressed and the vehicle is on even ground.

59. The suspension system of claim 46, said suspension system further comprising a control link force line that descends from the rear to the front of the vehicle at an angle of 0 to 60 degrees when the vehicle is on even ground and the suspension is fully compressed.

60. The suspension system of claim 46, said suspension system further comprising a wheel link force line that descends from the rear to the front of the vehicle at an angle of 0 to 30 degrees when the vehicle is on even ground and the suspension is fully compressed.

61. The suspension system of claim 46, said suspension system further comprising a wheel link force line that projects from the rear to the front of the vehicle at an angle of −30 to 30 degrees when the vehicle is on even ground and the suspension is fully compressed.

62. The suspension system of claim 43, wherein said wheel link and said brake link are arranged at an angle of 10 to 60 degrees when the suspension is uncompressed and the vehicle is on even ground.

63. The suspension system of claim 43, wherein said wheel link is 5 to 20 percent shorter than said brake link.

64. The suspension system of claim 43, said suspension system further comprising a control link that is 2 to 25 cm in length.

* * * * *